US010282286B2

(12) United States Patent
Li

(10) Patent No.: US 10,282,286 B2
(45) Date of Patent: May 7, 2019

(54) ADDRESS MAPPING USING A DATA UNIT TYPE THAT IS VARIABLE

(75) Inventor: Tieniu Li, San Jose, CA (US)

(73) Assignee: Micron Technology, Inc., Boise, ID (US)

(*) Notice: Subject to any disclaimer, the term of this patent is extended or adjusted under 35 U.S.C. 154(b) by 297 days.

(21) Appl. No.: 13/616,175

(22) Filed: Sep. 14, 2012

(65) Prior Publication Data

US 2014/0082323 A1 Mar. 20, 2014

(51) Int. Cl.
*G06F 12/02* (2006.01)
*G06F 12/10* (2016.01)

(52) U.S. Cl.
CPC ...... *G06F 12/0246* (2013.01); *G06F 12/0292* (2013.01); *G06F 12/10* (2013.01); *G06F 2212/7201* (2013.01)

(58) Field of Classification Search
USPC ........................................................ 711/103
See application file for complete search history.

(56) References Cited

U.S. PATENT DOCUMENTS

| 5,375,214 | A | 12/1994 | Mirza et al. |
| 5,963,983 | A | 10/1999 | Sakakura et al. |
| 6,845,057 | B2 | 1/2005 | Widmer et al. |
| 7,206,915 | B2 | 4/2007 | DeSouter et al. |
| 7,278,008 | B1 | 10/2007 | Case et al. |
| 7,480,762 | B2 | 1/2009 | Eggleston et al. |
| 7,610,437 | B2* | 10/2009 | Sinclair et al. ............... 711/103 |
| 7,984,233 | B2* | 7/2011 | Sinclair ........................... 711/103 |
| 8,065,470 | B2 | 11/2011 | Yano et al. |
| 8,255,661 | B2* | 8/2012 | Karr ....................... G06F 3/0613 711/103 |
| 8,271,762 | B2* | 9/2012 | Jiang ................... G06F 12/0246 711/103 |

(Continued)

FOREIGN PATENT DOCUMENTS

JP H09282111 10/1997
JP 2004199605 7/2004

(Continued)

OTHER PUBLICATIONS

A Superblock based Flash Translation Layer for NAND; Kang (Year: 2006).*

(Continued)

*Primary Examiner* — Reginald G Bragdon
*Assistant Examiner* — Paul M Knight
(74) *Attorney, Agent, or Firm* — Brooks, Cameron & Huebsch, PLLC

(57) ABSTRACT

The present disclosure includes methods, memory units, and apparatuses for address mapping. One method includes providing a mapping unit having logical to physical mapping data corresponding to a number of logical addresses. The mapping unit has a variable data unit type associated therewith and comprises a first portion comprising mapping data indicating locations on a memory of a number of physical data units having a size defined by the variable data unit type, and a second portion comprising mapping data indicating locations on the memory of a number of other mapping units of a mapping unit group to which the mapping unit belongs.

26 Claims, 10 Drawing Sheets

(56) References Cited

U.S. PATENT DOCUMENTS

| | | | |
|---|---|---|---|
| 8,949,568 B2* | 2/2015 | Wei | G06F 12/0246 711/103 |
| 9,025,619 B2* | 5/2015 | Su | H04J 3/1652 370/466 |
| 9,384,123 B2 | 7/2016 | Hida et al. | |
| 2006/0004941 A1 | 1/2006 | Shah et al. | |
| 2006/0212674 A1 | 9/2006 | Chung et al. | |
| 2008/0089129 A1 | 4/2008 | Lee | |
| 2008/0183955 A1* | 7/2008 | Yang | G06F 12/0246 711/103 |
| 2008/0307192 A1* | 12/2008 | Sinclair | G06F 12/0246 711/218 |
| 2009/0089518 A1 | 4/2009 | Hobbet et al. | |
| 2010/0030999 A1 | 2/2010 | Hinz | |
| 2010/0174860 A1* | 7/2010 | Kim | G06F 12/0246 711/112 |
| 2011/0225389 A1* | 9/2011 | Grisenthwaite | G06F 12/1009 711/206 |
| 2011/0283048 A1* | 11/2011 | Feldman | G06F 3/0611 711/103 |
| 2012/0023144 A1 | 1/2012 | Rub | |
| 2012/0023282 A1* | 1/2012 | Rub | 711/103 |
| 2012/0054419 A1 | 3/2012 | Chen et al. | |
| 2012/0179853 A1* | 7/2012 | Manning et al. | 711/3 |
| 2012/0215965 A1 | 8/2012 | Inada et al. | |
| 2013/0067138 A1* | 3/2013 | Schuette et al. | 711/103 |
| 2013/0103889 A1* | 4/2013 | Jeong | 711/103 |
| 2013/0151754 A1* | 6/2013 | Post et al. | 711/103 |
| 2014/0223089 A1* | 8/2014 | Kang | G06F 12/0246 711/103 |
| 2014/0325117 A1* | 10/2014 | Canepa | G06F 12/0246 711/103 |

FOREIGN PATENT DOCUMENTS

| | | |
|---|---|---|
| JP | 2010521718 | 6/2010 |
| JP | 2012141944 | 7/2012 |
| JP | 2012174086 | 9/2012 |

OTHER PUBLICATIONS

A PRAM and NAND Flash Hybrid Architecture; Kim 2008 (Year: 2008).*

Janus FTL Optimal Point Page and Block Mapping 2010; Kwon (Year: 2010).*

MicroFTL A Memory Efficient Flash Translation Layer; Lee (Year: 2008).*

MNFTL An Efficient Flash Translation Layer for MLC; Qin 2011 (Year: 2011).*

A Self-Adjusting Flash Translation Layer for Embedded Systems; Wu 2011 (Year: 2011).*

A Reconfigurable FTL (Flash Translation Layer) Architecture for NAND Flash-Based Applications by Park (Year: 2008).*

International Search Report and Written Opinion of international application No. PCT/US2013/059645, dated Dec. 30, 2013, 9 pp.

Supplementary European Search Report for related European Patent Application No. 13836722.2, dated Mar. 7, 2016, 7 pages.

Notice of Rejection for related Japan Patent Application No. 2015-532071, dated Jun. 7, 2016, 6 pages.

Decision of Rejection for related Korea Patent Application No. 10-2015-7009168, dated Dec. 20, 2018, 6 pages.

EP Communication Pursuant to Article 94(3) EPC for related EP Patent Application No. 13836722.2, dated Jan. 29, 2018, 6 pages.

Notice of Reasons for Rejection for related Korea Patent Application No. 10-2015-7009168, dated Apr. 27, 2017, 15 pages.

* cited by examiner

US 10,282,286 B2

ADDRESS MAPPING USING A DATA UNIT TYPE THAT IS VARIABLE

TECHNICAL FIELD

The present disclosure relates generally to semiconductor memory and methods, and more particularly, to address mapping.

BACKGROUND

Memory devices are typically provided as internal, semiconductor, integrated circuits in computers or other electronic devices. There are many different types of memory including volatile and non-volatile memory. Volatile memory can require power to maintain its data (e.g., information) and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, static random access memory (SRAM), resistance variable memory, such as phase change random access memory (PCRAM) and resistive random access memory (RRAM), and magnetic random access memory (MRAM), such as spin torque transfer random access memory (STT RAM), among others.

Memory devices can be combined together to form a solid state drive (SSD). A solid state drive can include non-volatile memory such as NAND flash memory and/or NOR flash memory, and/or can include volatile memory such as DRAM, among various other types of non-volatile and volatile memory. Flash memory devices, including floating gate flash devices and charge trap flash (CTF) devices can comprise memory cells having a storage structure (e.g., a floating gate or a charge trapping structure) used to store charge and may be utilized as non-volatile memory for a wide range of electronic applications.

Various apparatuses (e.g., computing systems) can comprise an SSD coupled to a host (e.g., a personal laptop computer, a desktop computer, a digital camera, a mobile telephone, or a memory card reader, among various other types of hosts). Memory management processes associated with SSD operation can suffer inefficiencies due to sub-page writes, misaligned writes, and/or unpredictable temporal and spatial locality, for example. Such inefficiencies can be due to factors such as input/output (I/O) workload pattern irregularity associated with commands (e.g., write, read, erase, etc.) received from the host, which can increase write amplification and/or reduce garbage collection efficiency, among other drawbacks. Memory management processes often employ logical to physical (L2P) mapping data structures (e.g., tables) to map between logical address space and physical address space (e.g., to determine locations of physical data stored on a memory). However, many current L2P mapping approaches are not able to effectively account for host I/O workload pattern irregularity.

DETAILED DESCRIPTION

Figure 1:
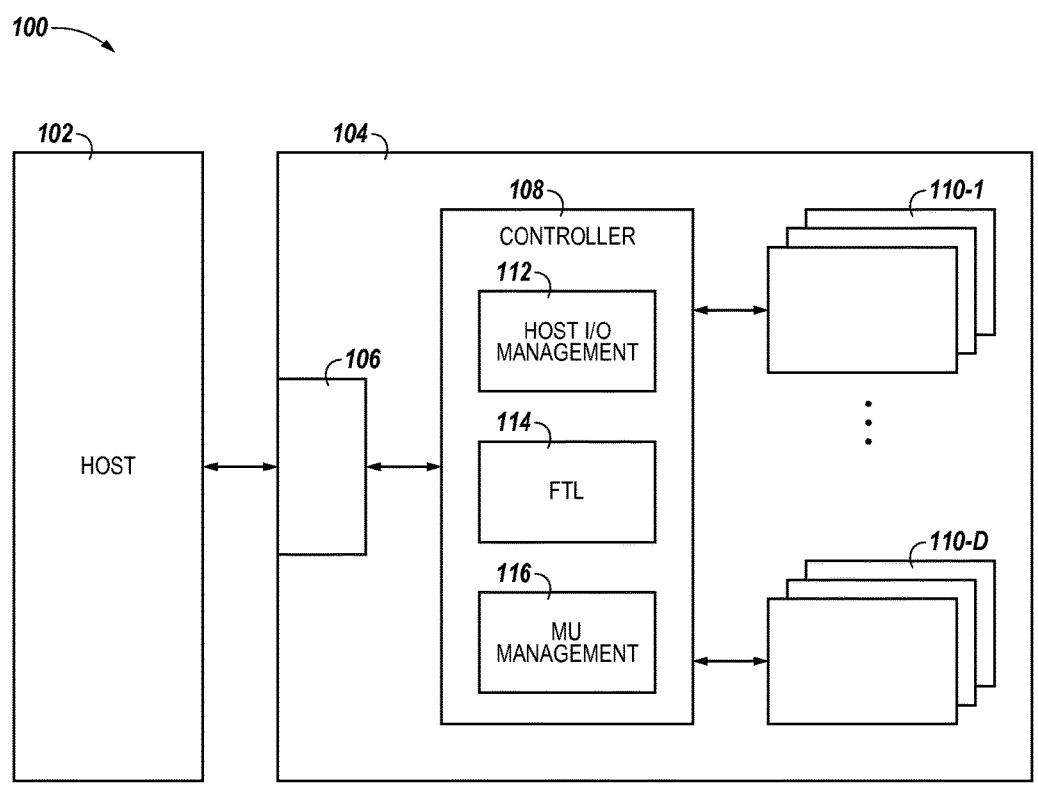
FIG. 1 is a block diagram of an apparatus in the form of a computing system including at least one memory system in accordance a number of embodiments of the present disclosure.

The present disclosure includes methods, memory units, and apparatuses for address mapping. One method includes providing a mapping unit having logical to physical mapping data corresponding to a number of logical addresses. The mapping unit has a variable data unit type associated therewith and comprises a first portion comprising mapping data indicating locations on a memory of a number of physical data units having a size defined by the variable data unit type, and a second portion comprising mapping data indicating locations on the memory of a number of other mapping units of a mapping unit group to which the mapping unit belongs.

A number of embodiments of the present disclosure can provide a logical to physical address mapping approach that can be adjusted based on the I/O workload of a host, for example. As such, a number of embodiments can provide benefits such as improved garbage collection efficiency and/or reduced write amplification as compared to prior address mapping techniques.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designators "D" and "m", particularly with respect to reference numerals in the drawings, indicate that a number of the particular feature so designated can be included with a number of embodiments of the present disclosure. As used herein, "a number of" something can refer to one or more of such things.

The figures herein follow a numbering convention in which the first digit or digits correspond to the drawing figure number and the remaining digits identify an element or component in the drawing. Similar elements or components between different figures may be identified by the use of similar digits. For example, 301 may reference element "01" in FIG. 3, and a similar element may be referenced as 401 in FIG. 4. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present invention, and should not be taken in a limiting sense.

FIG. 1 is a block diagram of an apparatus in the form of a computing system 100 including at least one memory system 104 in accordance a number of embodiments of the present disclosure. As used herein, a memory system 104, a controller 108, or a memory device 110 might also be separately considered an "apparatus". The memory system 104 can be a solid state drive (SSD), for instance, and can include a host interface 106, a controller 108 (e.g., a processor and/or other control circuitry), and a number of memory devices 110-1, . . . , 110-D (e.g., solid state memory devices such as NAND flash devices), which provide a storage volume for the memory system 104. In a number of embodiments, the controller 108, a memory device 110-1 to 110-D, and/or the host interface 106 can be physically located on a single die or within a single package (e.g., a managed NAND application). Also, in a number of embodiments, a memory (e.g., memory devices 110-1 to 110-D) can include a single memory device. In this example, each of the memory devices 110-1 to 110-D corresponds to a respective memory channel, which can comprise a group of memory devices (e.g., dies or chips); however, embodiments are not so limited. Additionally, in a number of embodiments, the memory devices 110 can comprise different types of memory. For instance, memory devices 110-1 to 110-D can comprise phase change memory devices, DRAM devices, multilevel (MLC) NAND flash devices, single level (SLC) NAND flash devices, and/or combinations thereof.

The host interface 106 can be used to transfer data between the memory system 104 and a host 102. The interface 106 can be in the form of a standardized interface. For example, when the memory system 104 is used for data storage in a computing system 101, the interface 106 can be a serial advanced technology attachment (SATA), a serial attached SCSI (SAS), a peripheral component interconnect express (PCIe), or a universal serial bus (USB), among other connectors and interfaces. In general, however, interface 106 can provide an interface for passing control, address, data, and other signals between the memory system 104 and a host 102 having compatible receptors for the interface 106. Host 102 can be a host system such as a personal laptop computer, a desktop computer, a digital camera, a mobile telephone, or a memory card reader, among various other types of hosts. Host 102 can include a system motherboard and/or backplane and can include a number of memory access devices (e.g., a number of processors).

The controller 108 can communicate with the memory (e.g., memory devices 110-1 to 110-D) to control data read, write, and erase operations, among other operations. The controller 108 can include, for example, a number of components in the form of hardware and/or firmware (e.g., one or more integrated circuits) and/or software for controlling access to the memory and/or for facilitating data transfer between the host 102 and memory.

In the example illustrated in FIG. 1, the controller 108 includes a host I/O management component 112, a flash translation layer (FTL) 114, and a memory unit management component 116. However, the controller 108 can include various other components not illustrated so as not to obscure embodiments of the present disclosure. Also, although the components 112, 114, and 116 are illustrated as resident on the controller 108, in some embodiments, the component 112, 114, and/or 116 may reside elsewhere in the system 100 (e.g., as an independent component or resident on a different component of the system).

In embodiments in which the memory (e.g., memory devices 110-1 to 110-D) includes a number of arrays of memory cells, the arrays can be flash arrays with a NAND architecture, for example. However, embodiments are not limited to a particular type of memory array or array architecture. The memory cells can be grouped, for instance, into a number of blocks, which are erased together as a group and can store a number of pages of data per block. A number of blocks can be included in a plane of memory cells and an array can include a number of planes. As used herein, a "page of data" refers to an amount of data that the controller 108 is configured to write/read to/from the memory 110 as part of a single write/read operation and can be referred to as a "flash page". As an example, a memory device may have a page size of 8 KB (kilobytes) and may be configured to store 128 pages of data per block, 2048 blocks per plane, and 16 planes per device.

Unlike with traditional hard disk drives, data stored in flash memory cannot be directly overwritten. That is, a block of flash cells must be erased prior to rewriting data thereto (e.g., a page at a time). In embodiments in which at least one of memory devices 110-1 to 110-D comprises flash memory cells, the controller 108 can manage data transferred between the host 102 and the memory 110 via a logical to physical mapping scheme. For instance, the flash translation layer 114 can employ a logical addressing scheme (e.g., logical block addressing (LBA)). As an example, when new data received from host 102 is to replace older data already written to memory 110, the controller 108 can write the new data in a new location on memory 110 and the logical to physical mapping of FTL 114 can be updated such that the corresponding logical address(es) associated with the new data being written indicates (e.g., points to) the new physical location. The old location, which no longer stores valid data, will be erased prior to being written again.

Flash memory cells can be cycled (e.g., programmed/erased) a limited number of times before they become unreliable. The controller 108 can implement wear leveling to control the wear rate on the memory 110, which can reduce the number of program/erase cycles performed on a particular group (e.g., block) by spreading the cycles more evenly over the entire array. Wear leveling can include a technique called garbage collection, which can include reclaiming (e.g., erasing and making available for writing), blocks that have the most invalid pages. An invalid page can refer to a page containing invalid data (e.g., a page that no longer has an up to date mapping associated therewith). Alternatively, garbage collection can include reclaiming blocks with more than a threshold amount of invalid pages. If sufficient free blocks exist for a writing operation, then a garbage collection operation may not occur.

Write amplification may occur when writing data to flash memory devices 110. When randomly writing data to a memory array, the controller 108 scans for available space in the array. Available space in a memory array can be individual cells, pages, and/or blocks of memory cells that are not storing data and/or have been erased. If there is enough available space to write the data in a selected location, then the data is written to the selected location of the memory array. If there is not enough available space in the selected location, the data in the memory array is rearranged by reading, copying, moving, or otherwise rewriting and erasing the data that is already present in the selected location to a new location, leaving available space for the new data that is to be written in the selected location. The relocation of valid data in the memory array is referred to as write amplification because the amount of data written to memory is greater than the amount of data that would occur if there were sufficient available space in the selected location (e.g., the physical amount of data is greater than the logical amount intended to be written). Write amplification is undesirable since it can consume bandwidth, which reduces performance, and can reduce the useful lifetime of an SSD. The amount of write amplification can be effected by various factors such as garbage collection efficiency, wear leveling efficiency, amount of random writes (e.g., writes to non-sequential logical addresses), and/or over-provisioning (e.g., the difference between the physical capacity of flash memory and the logical capacity presented through the operating system as available to the user), among other factors.

The flash translation layer 114 can, in collaboration with the host I/O management component 112 and the mapping unit management component 116, perform address mapping in accordance with a number of embodiments described herein. In a number of embodiments, the host I/O management component 112 manages data received in association with write commands from the host 102 (e.g., prior to mapping via FTL 114). The I/O workload of the host 102 can be irregular and/or variable. For instance, large file writes (e.g., writes corresponding to a large amount of data) can often be mixed with small writes (e.g., writes corresponding to a small amount of data). In this context, "large" and "small" refer only to a relative difference in size. As an example, a small write may refer to writing of 4 KB of metadata corresponding to a larger file. A large file write may include writing of 128 KB of data, for instance. A large file write may comprise a number of consecutive large file writes. For instance, writing of a 2 GB video file may comprise a number of consecutive 128 KB write commands from the host 102.

The host I/O management 112 can be configured to manage received data in units of a particular size. The particular size of the data units managed by host I/O management component 112 can correspond to a size of available buffers and may be 4 KB, for instance. As such, the host I/O management 112 can organize data received from host 102 as 4 KB units to be mapped via FTL 114. As used herein, the data unit size managed by host I/O management 112 can be referred to as a "system page size".

As described further herein, the mapping unit (MU) management 116 can, in a number of embodiments, monitor the I/O workload of the host 102. For instance, the MU management 116 can track, for multiple memory units and/or memory unit groups (MUGs), the logical addresses associated with incoming write commands from host 102 and the corresponding sizes (e.g., amount of data) associated therewith, which can be used to determine a data unit size for the respective MUs and/or MUGs, for instance.

Figure 2:
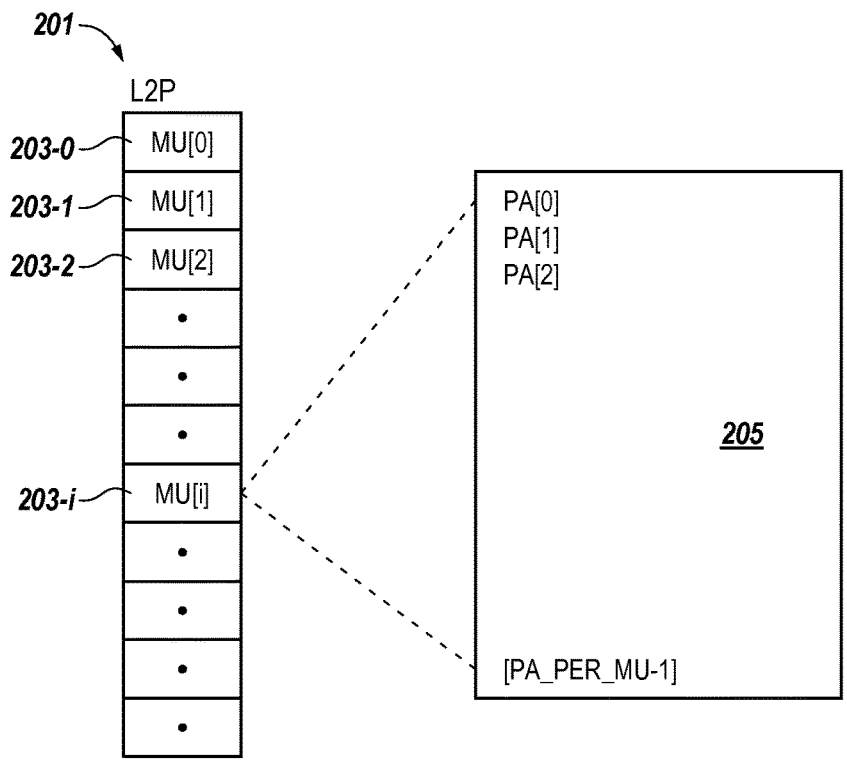
FIG. 2 is a logical to physical address map in accordance with a previous address mapping approach.

FIG. 2 is a logical to physical (L2P) address map in accordance with a previous address mapping approach. The L2P map 201 can be in the form of a data structure such as a table, for instance. The L2P map 201 includes a number of MUs 203-0, 203-1, 203-2, . . . , 203-i, etc., which will be collectively referred to as MUs 203. Each of the MUs 203 can store a fixed amount of mapping data used to map between logical and physical addresses. The fixed amount of data can be equal to the page size associated with the memory to which data is to be written. For instance, if the memory (e.g., memory devices 110 shown in FIG. 1) has an associated page size of 8 KB, then each MU 203 may store 8 KB of mapping data. Each MU 203 comprises a physical address (PA) data structure (e.g., table) comprising a fixed number of entries each mapping a logical page to a physical page. For instance, as shown in FIG. 2, PA table 205 comprises a number of entries (e.g., PA[0], PA[1], PA[2], PA[PA_PER_MU−1]), where "PA_PER_MU" can be 2,048, for example. As such, if each MU 203 comprises 2,048 entries and each entry maps to an 8 KB page, each MU 203 can map 16 MB of memory (e.g., 8 KB per entry multiplied by 2,048 entries).

Due to the relatively large size of the address map 201, the MUs 203 can be stored on a memory (e.g., memory 110) and can be accessed, when appropriate, based on the logical addresses to be written in association with write operations from a host (e.g., host 102). For instance, one or more of the MUs 203 can be transferred from memory 110 to memory of the controller (e.g., DRAM, SRAM, etc.), for instance. The mapping data of the accessed MU 203 can then be updated such that it maps to the appropriate physical location on the memory, and the updated MU 203 can be written back to memory 210.

However, prior art address mapping approaches, such as the address mapping approach described in FIG. 2, can have various drawbacks, which can lead to increased write amplification, for instance. For example, each of the entries of the PA table 205 corresponding to each of the respective MUs 203 maps to a same amount of physical data (e.g., an 8 KB page size in this example). Since the host I/O workload can be irregular and/or variable, the lack of flexibility with respect to the size of physical data units mapped by MUs 203, can lead to an increase in the amount of MU management overhead, such as a large number of updates (e.g., to mapping table entries) due to long consecutive data writes, sub-page writes (e.g., writes of amounts of data less than a page size) and/or misaligned writes (e.g., writes of data units that are not aligned with physical page boundaries) due to small data writes to random memory locations, for instance. The variable and/or irregular host I/O workload can also lead to unpredictable temporal and/or spatial locality, which can also lead to increased write amplification due to the lack of flexibility (e.g., adaptability) with respect to the size of the physical data units mapped by the MUs 203 of address map 201. As described further below in association with FIGS. 3 through 10, a number of embodiments of the present disclosure provide a more flexible address mapping approach as compared to approaches such as that described in connection with FIG. 2, which can provide improved write amplification, among other benefits.

Figure 3:
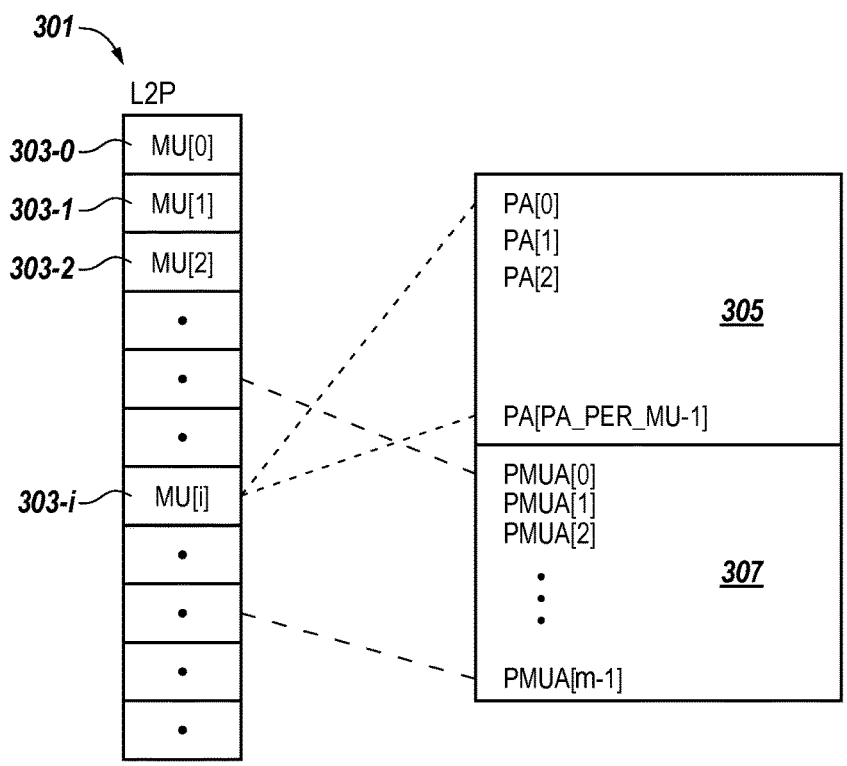
FIG. 3 is a logical to physical address map in accordance with a number of embodiments of the present disclosure.

FIG. 3 is a L2P map 301 in accordance with a number of embodiments of the present disclosure. The L2P map 301 can be in the form of a data structure such as a table, for instance. The L2P map 301 includes a number of MUs 303-0, 303-1, 303-2, . . . , 303-i, etc., collectively referred to as MUs 303. In a number of embodiments, and similar to the MUs 203 described in FIG. 2, each of the MUs 303 can store a fixed amount of mapping data used to map between logical and physical addresses. The fixed amount of data can be equal to the page size associated with the memory (e.g., memory 110 shown in FIG. 1) to which data is to be written. For instance, if the memory has an associated page size of 8 KB, then each MU 303 may comprise 8 KB of available mapping data space.

Each MU 303 corresponds to a number of logical addresses. In a number of embodiments, each MU 303 corresponds to a fixed range of non-overlapping logical addresses. For instance, MU 303-0 can correspond to logical addresses 0-1,024, MU 303-1 can correspond to logical addresses 1,025-2,048, etc. Also, as described further herein, each MU 303 can have an associated variable data unit type, which can define the size of physical data units mapped by a particular MU 303.

As illustrated by MU 303-*i* of FIG. 3, each MU 303 can comprise a first portion 305 of mapping data and a second portion 307 of mapping data. The first portion 305 can comprise mapping data indicating locations on a memory (e.g., memory 110) of a number of physical data units having a size defined by the variable data unit type. As an example, the first portion 305 can comprise a physical address (PA) table (e.g., a data unit mapping table). However, unlike prior approaches using PA tables such as PA table 205 shown in FIG. 2, which have entries each mapping to a physical page, the entries of PA table 305 each map to a physical data unit having a particular size, which may or may not be equal to a page size. For instance, in a number of embodiments, the L2P map 301 has a base data unit size associated therewith. As used herein, the base data unit size can refer to a smallest data unit size mapped via L2P map 301. For instance, the base data unit size can be smaller than, equal to, or larger than a page size of the memory. As an example, if the page size of the memory is 8 KB, then the base data unit size may be 4 KB, 8 KB, 16 KB, etc. In a number of embodiments, the base data unit size can be equal to a system page size (e.g., a data size managed by host I/O management 112 shown in FIG. 1).

In various instances, a system page size may not be the same as a page size of the memory (e.g., a flash page size). For example, the system page size may be 4 KB and the page size of the memory may be 8 KB, which can lead to data fragmentation and/or misalignment associated with I/O requests (e.g., if the logical to physical mapping maps only to 8 KB page sizes, such as in previous approaches). As such, in a number of embodiments of the present disclosure, the base data unit size is the same as the system page size; however, embodiments are not so limited.

In the example shown in FIG. 3, the PA table 305 of MU 303-*i* comprises entries PA[0] through PA[PA_PER_MU−1], where "PA_PER_MU" can be 1,024, for instance. As described further below, the number of entries in mapping table 305 can depend on factors such as the available mapping data space used for table 305 and the size of the data units mapped by the entries PA[0] through PA[PA_PER_MU−1], among other factors. As an example, each of the entries of mapping table 305 can indicate the location on memory of a physical data unit having the base data unit size. However, as described further below, in a number of embodiments, the entries of a mapping table can indicate locations on the memory of physical data units having a size other than the base data unit size, which may be a multiple of the base data unit size, for example.

The second portion 307 of a mapping unit 303 can comprise mapping data indicating locations on the memory of a number of other mapping units of a mapping unit group to which the mapping unit 303 belongs. As an example, the second portion 307 can be a mapping table (e.g., a MU mapping table) comprising entries pointing to locations (e.g., on memory such as memory 110) of each of the mapping units of a particular mapping unit group to which MU 303-*i* belongs. As such, MU mapping table 307 entries comprise physical mapping unit addresses PMUA[0], PMUA[1], PMUA[2], . . . , PMUA[m−1], where "m" can be 128, 256, 512, 2,048, etc. As described further below, the L2P map 301 can comprise a number of mapping unit groups (MUGs), which can each be a fixed range of non-overlapping MUs 303. For instance, if each MUG comprises 512 MUs 303, then a first MUG could comprise MU[0]-MU[511] and a next MUG could comprise MU[512]-MU[1023], etc.

As described further herein, in a number of embodiments, the second portion 307 can include data indicating the variable data unit type corresponding to the respective MUs of the MUG. For instance, each entry (e.g., PMUA[0], PMUA[1], PMUA[2], . . . , PMUA[m−1]) of table 307 can include data indicating the variable data unit type corresponding to the particular MU to which the respective entry maps.

In a number of embodiments, the total amount of available mapping data space corresponding to an MU (e.g., 303) can be allotted in various manners (e.g., between first portion 305 and second portion 307), while maintaining a particular total amount of space mapped by a MUG. That is, that table sizes can be adjusted such that the table sizes are different between MUGs. As one example, MU 303-*i* can be one of "m" MUs in a particular MUG that maps 2 GB of space. For this example, assume each entry of table 305 maps to a physical data unit equal to a base data unit size of 4 KB. Therefore, if the number of entries in table 305 (e.g., PA_PER_MU) is 1024, then MU 303-*i* maps 4 MB of space (1024×4 KB). As such, in order for the MUG to which MU 303-*i* belongs to map 2 GB of space, the number of entries in table 307 (e.g., "m") must be 512 (4 MB×512=2 GB). Alternatively, PA_PER_MU can be 128 such that MU 303-*i* maps 512 KB (128×4 KB) and "m" can be 4096 (512 KB×4096=2 GB). However, embodiments are not limited to this example.

Figure 4:
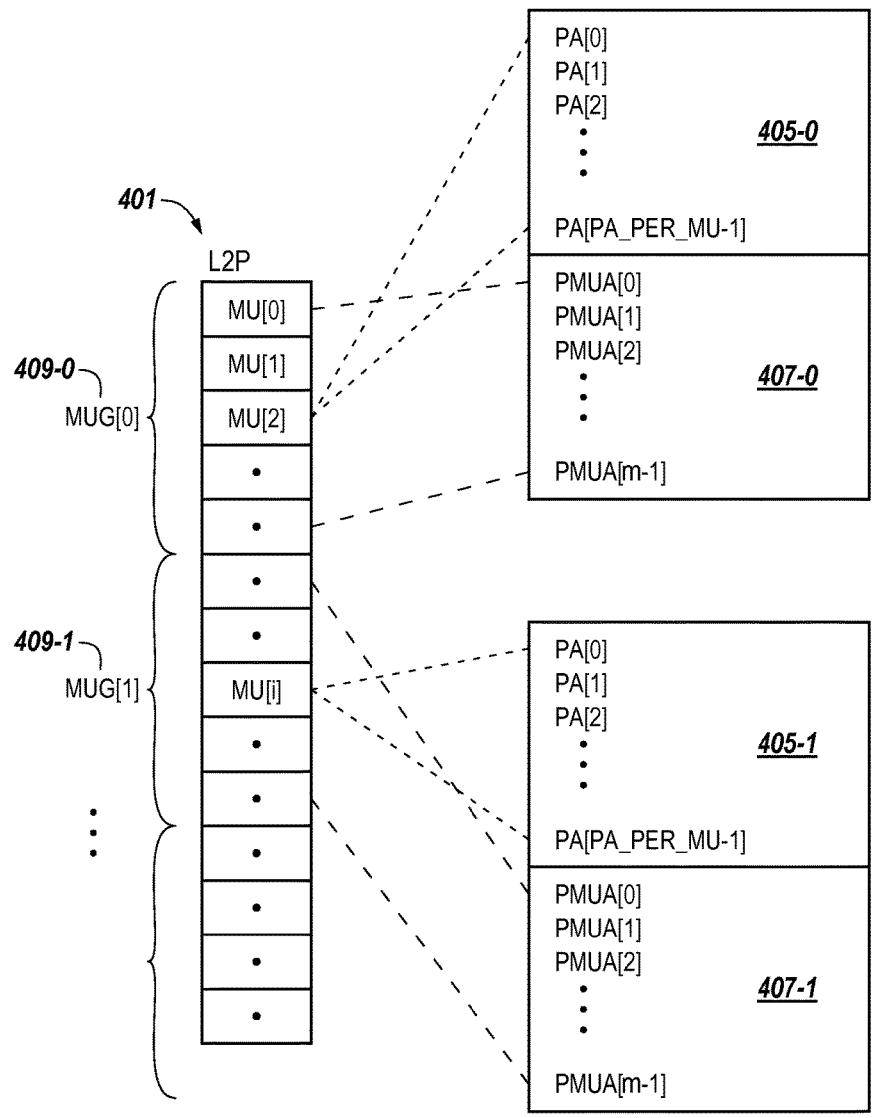
FIG. 4 illustrates a number of mapping unit groups in accordance with a number of embodiments of the present disclosure.

FIG. 4 illustrates a number of mapping unit groups in accordance with a number of embodiments of the present disclosure. In a number of embodiments, the MUs of a L2P map can be organized into a number of MUGs. FIG. 4 illustrates an L2P map 401 comprising a number of MUGs 409-0 (MUG[0]) and 409-1 (MUG[1]); however, a number embodiments can include more than two MUGs. The MUs of FIG. 4 can be analogous to the MUs 303 described in FIG. 3. Each of the MUGs 409 comprises a number of MUs (e.g., MU[0], MU[1], MU[2], . . . , MU[i] . . . ). In a number of embodiments, each of the MUs maps a same amount of memory space (e.g., 4 MB, 16 MB, 128 MB, etc.). However, the MUs of a particular MUG (e.g., 409-0) may map a different amount of memory space than the MUs of a different MUG (e.g., 409-1). In a number of embodiments, each of the MUGs 409 map a same amount of memory space (e.g., 256 MB, 2 GB, 4 GB, etc.); however, embodiments are not so limited. In a number of embodiments, each MUG 409 corresponds to a particular range of logical addresses and the logical addresses corresponding to respective MUGs 409 do not overlap. As such, the logical address space mapped by MUG 409-0 is different than the logical address space mapped by MUG 409-1.

As described above in association with FIG. 3, the MUs of each MUG 409 can store a fixed amount of mapping data in a mapping data space that comprises a first portion 405 and a second portion 407. As shown in FIG. 4, MU[2] of MUG 409-0 comprises a first portion 405-0 and a second portion 407-0. Similarly, MU[i] of MUG 409-1 comprises a first portion 405-1 and a second portion 407-1. The second portion 407 can be a MU mapping table comprising entries pointing to locations on memory of each of the MUs of a MUG 409. The table 407 can also indicate the variable data unit type corresponding to the MUs of the MUG 409.

In operation, a host (e.g., 102) can issue a write command associated with a number of logical addresses. A controller (e.g., 108) can receive the write command and can access (e.g., via an FTL such as FTL 114) the particular MU (which may be stored on a memory such as memory 110) corresponding to the number of logical addresses. The data corresponding to the write command can be written to the memory and the mapping data of portion 405 of the MU can be updated such that the logical addresses map to the location on the memory of the newly written data. In a number of embodiments, the mapping data of the second portion 407 of the MU can also be updated (e.g., prior to writing the MU back to memory). As further described in association with FIG. 10, maintaining up to date mapping data of the second portion 407 can include determining a current up to date one of the MUs of the MUG 409 (e.g., the MU which was most recently written to memory), and replacing the invalid indicators corresponding to the second portion 407 of the MU being updated with the up to date indicators corresponding to the second portion 407 of the current up to date MU of the MUG.

Figure 5:
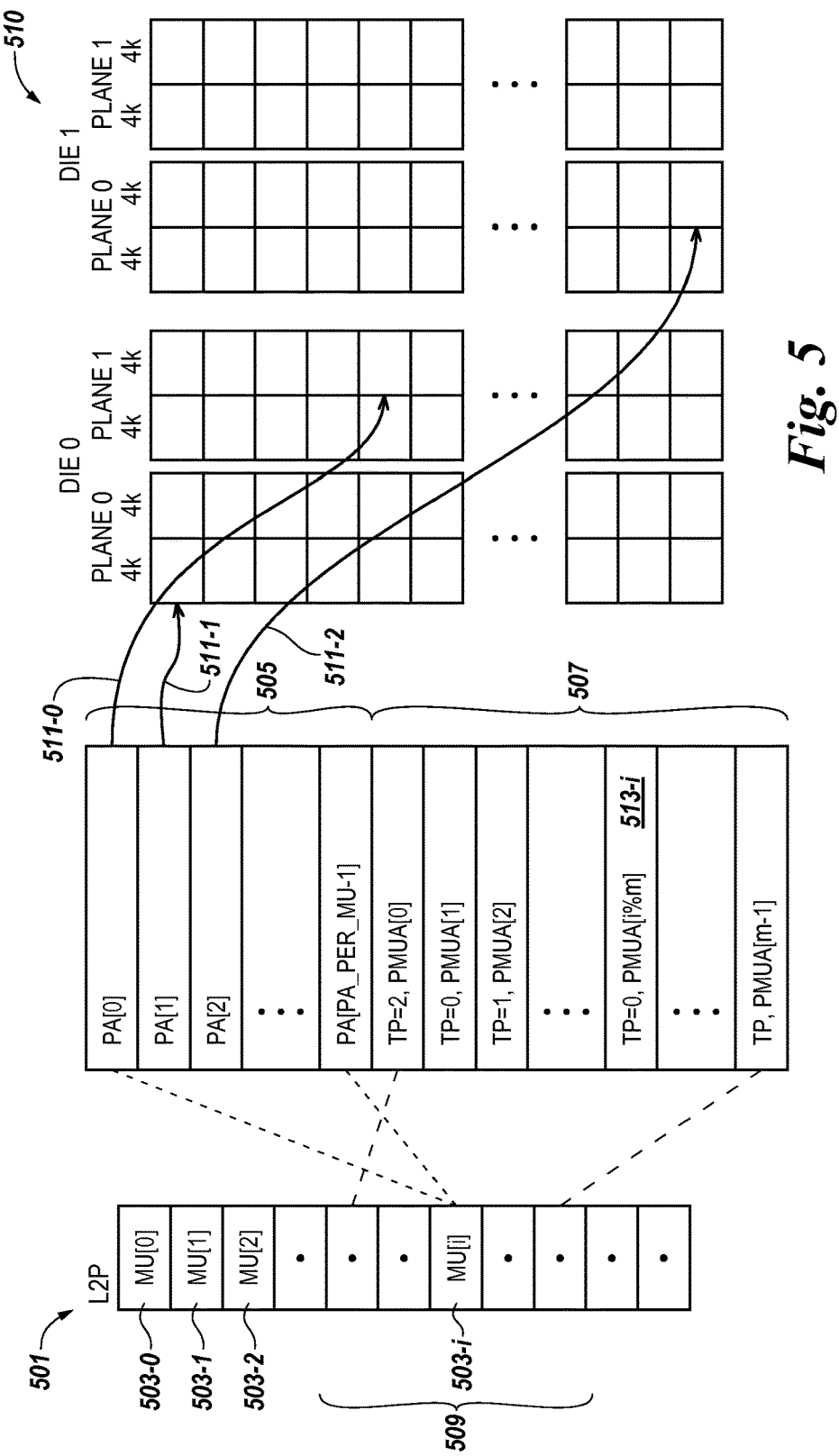
FIG. 5 illustrates a number of mapping units associated with address mapping in accordance with a number of embodiments of the present disclosure.

FIG. 5 illustrates a number of mapping units (503-0, 503-1, 503-2, . . . , 503-$i$, . . . ) associated with address mapping in accordance with a number of embodiments of the present disclosure. As described above, the MUs 503 can be organized as a number of MUGs such as MUG 509 in a L2P map 501. The MUs 503 and MUG 509 of FIG. 5 can be analogous to the MUs and MUGs described in association with prior Figures, for instance. In this example, the MUG 509 comprises MU 503-$i$ (MU[i]), as well as a number of other "neighboring" MUs 503. As shown in FIG. 5, MU[i] comprises a first portion 505 comprising mapping data indicating locations on a memory 510 of a number of physical data units, and a second portion 507 comprising mapping data indicating locations on the memory 510 of a number of other MUs of MUG 509, to which MU[i] belongs. In a number of embodiments, the mapping data of portion 507 can indicate locations on memory other than memory 510 (e.g., on a different memory device and/or different type of memory).

The memory 510 can comprise a number of memory devices such as memory devices 110-1 to 110-D shown in FIG. 1, for instance. In the example shown in FIG. 5, the memory 510 comprises a first die (Die 0) and a second die (Die 1), each comprising a first plane (Plane 0) and a second plane (Plane 1) of memory cells; however, embodiments are not limited to a particular number of dies and/or planes associated with memory 510.

The portion 505 of MU[i] can comprise a data unit mapping table, for instance. In the example shown in FIG. 5, the portion 505 comprises a table having entries PA[0] through [PA_PER_MU−1], with each entry indicating a location of (e.g., pointing to) a physical data unit on memory 510. For instance, in this example, the arrows 511-0, 511-1, and 511-2 corresponding to respective table entries PA[0], PA[1], and PA[2], point to 4 KB physical data units on memory 510. That is, each table entry of portion 505 can indicate a physical address (PA) of a data unit on the memory 510. As described herein, the size of the data units to which the table entries of portion 505 point is defined by a variable data unit type corresponding to MU[i].

The portion 507 of MU[i] can also comprise a MU mapping table, for instance. In the example shown in FIG. 5, the portion 507 comprises a table including an entry corresponding to each respective MU of MUG 509. In this example, the number of MUs corresponding to MUG 509 is indicated by index "m". As such, each table entry of portion 507 indicates a location on memory 510 of a particular one of the "m" MUs of MUG 509 (e.g., as indicated by physical mapping unit addresses PMUA[ ] through PMUA[m−1]).

Each table entry of portion 507 also includes attribute data corresponding thereto which indicates the variable unit data type (TP) of the MU to which the entry corresponds. The variable data unit type can, for instance, define the data unit size of the corresponding MU. As an example, TP=0 can indicate that the data unit size of the corresponding MU is equal to the base data unit size (e.g., a smallest data unit size of the number of variable data unit sizes). TP=1 can indicate that the data unit size of the corresponding MU is equal to twice the base unit size, and TP=2 can indicate that the data unit size of the corresponding MU is equal to four times the base unit size. In this example, the base data unit size is 4 KB. As described above, in a number of embodiments, the base data unit size can be less than the page size corresponding to the memory (e.g., 510), which can be 8 KB, for instance. As indicated by table entry 513-$i$, MU[i] has a corresponding variable data unit type of 0 (e.g., TP=0), which is reflected by the fact that the table entries of portion 505 point to 4 KB data units on memory 510 (e.g., as indicated by arrow 511-0, 511-1, and 511-2). Embodiments are not limited to this example.

Figure 6A:
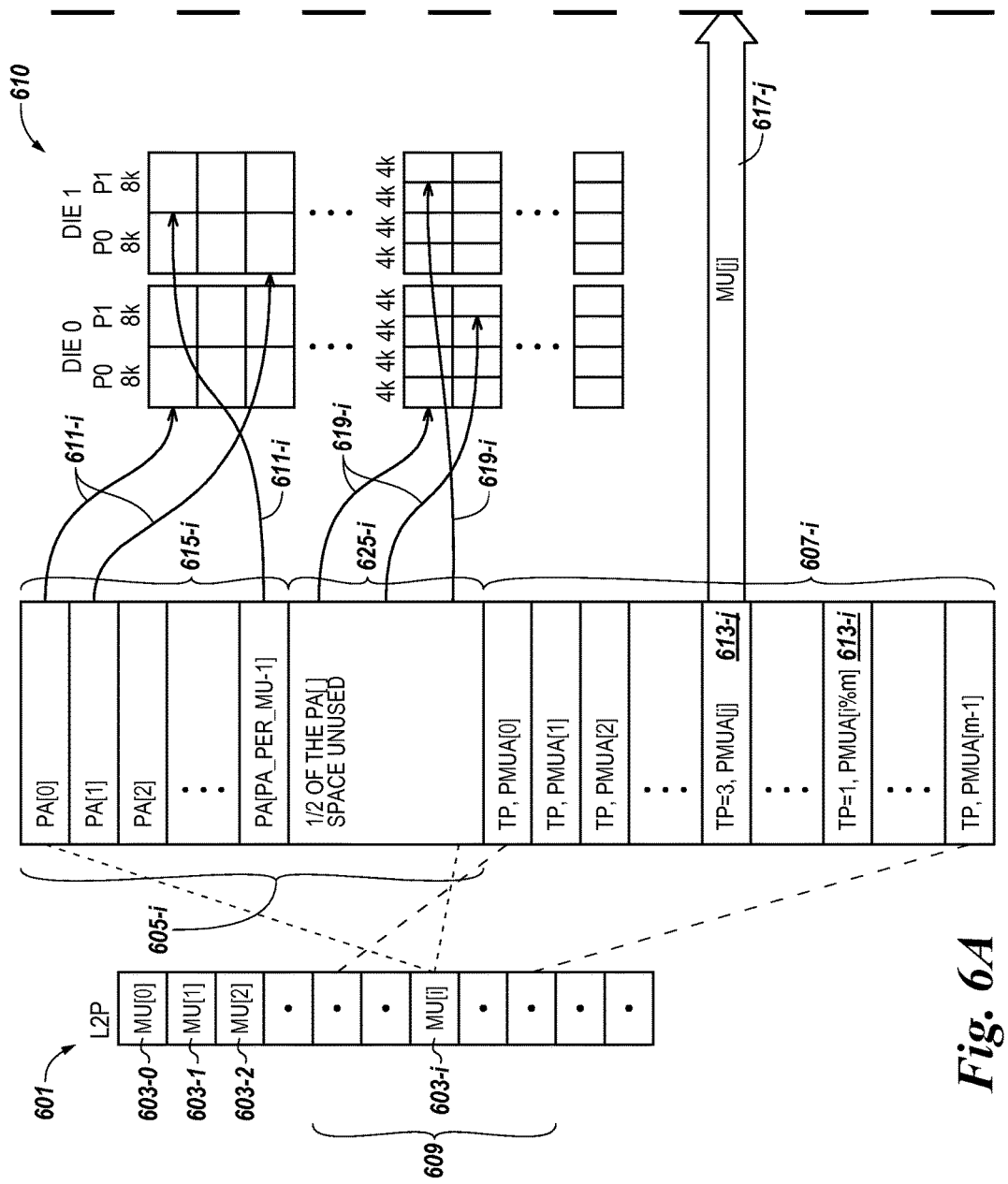
FIG. 6 illustrates a number of mapping units associated with address mapping in accordance with a number of embodiments of the present disclosure.
Figure 6B:
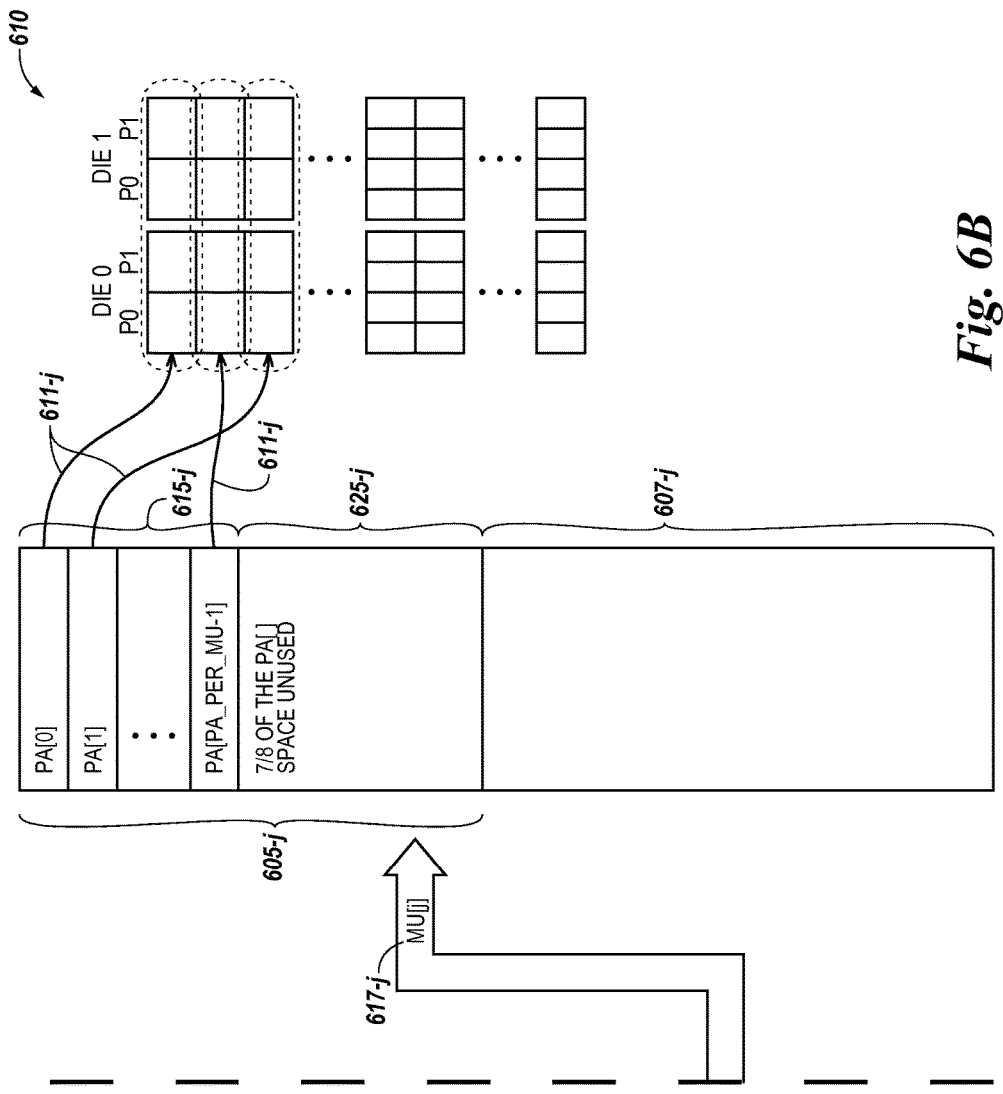

FIG. 6 illustrates a number of mapping units (603-0, 603-1, 603-2, . . . , 603-$i$, . . . ) associated with address mapping in accordance with a number of embodiments of the present disclosure. As described above, the MUs 603 can be organized as a number of MUGs such as MUG 609 in a L2P map 601. The MUs 603 and MUG 609 of FIG. 6 can be analogous to the MUs and MUGs described in association with prior Figures, for instance. In this example, the MUG 609 comprises MU 603-$i$ (MU[i]), as well as a number of other "neighboring" MUs 603 (e.g., the other MUs 603 of the MUG 609 to which MU 603-$i$ belongs). As shown in FIG. 6, MU[i] comprises a first portion 605-$i$ comprising mapping data indicating locations on a memory 610 of a number of physical data units, and a second portion 607-$i$ comprising mapping data indicating locations on the memory 610 of a number of other MUs of MUG 609, to which MU[i] belongs. In a number of embodiments, the mapping data of portion 607-$i$ can indicate locations on memory other than memory 610 (e.g., on a different memory device and/or different type of memory).

The memory 610 can comprise a number of memory devices such as memory devices 610-1 to 610-D shown in FIG. 1, for instance. In the example shown in FIG. 6, the memory 610 comprises a first die (Die 0) and a second die (Die 1), each comprising a first plane (Plane 0) and a second plane (Plane 1) of memory cells; however, embodiments are not limited to a particular number of dies and/or planes associated with memory 610.

The portion 605-$i$ of MU[i] can comprise a fixed amount of space. In a number of embodiments, an amount of the space 605-$i$ used for indicating locations (e.g., physical addresses) of the data units corresponding to the MU (e.g., the size of the data unit mapping table) may be less than the available amount of space corresponding to portion 605-$i$. In the example shown in FIG. 6, a portion of available space 605-$i$ comprises a data unit mapping table 615-$i$ indicating the physical locations of data units corresponding to MU[i] that have a size defined by a variable data unit type corresponding to MU[i]. The amount of space 615-$i$ can depend on the variable data unit type corresponding to MU[i]. As described further below, in this example, the variable data unit type corresponding to MU[i] is TP=1, which can indicate that the data unit size (e.g., 8 KB) corresponding to MU[i] is twice that of the base data unit size (e.g., 4 KB). As such, there are half as many entries in table 615-*i* as there would be if the variable data unit type corresponding to MU[i] were TP=0. That is, since the size of the data units corresponding to MU[i] is twice as large as the base data unit size, half as many table entries corresponding to portion 615-*i* are used in order to map the same amount of logical space. Therefore, if PA_PER_MU indicates the number of entries in table 615-*i* assuming a base data unit size, then PA_PER_MU/2 is the number of table entries in table 615-*i* assuming the data unit size corresponding to MU[i] is twice the base data unit size. As such, table 615-*i* shown in FIG. 6 includes entries PA[0] through PA[PA_PER_MU/2], and each of the entries points to an 8 KB data unit on memory 610 (e.g., as indicated by arrows 611-*i*).

As shown in FIG. 6, in a number of embodiments, the variable data unit type corresponding to an MU (e.g., MU[i]) may be such that the amount of space (e.g., 615-*i*) used for mapping data corresponding data units having a size defined by the variable data unit type is less than the amount of space available (e.g., 605-*i*). In such embodiments, at least a portion (e.g., 625-*i*) of the available space (605-*i*) can provide indicators pointing to data units corresponding to the MU that have a size other than the size defined by the variable data unit type. For instance, the portion 625-*i* can comprise a data structure such as a tree (e.g., a hash tree, b-tree, etc.), for example, that maintains map updates associated with overwrites to the logical space mapped by MU[i] (e.g., due to a variable/irregular host I/O workload). For instance, one or more 4 KB write operations initiated by a host and associated with the logical address range corresponding to MU[i] may be interspersed with several 8 KB write operations to the same logical address range corresponding to MU[i]. Rather than adjusting the current 8 KB data unit size corresponding to MU[i], due to the 4 KB writes, the portion 625-*i* can be used indicate the locations of the smaller 4 KB data units on memory 610 (e.g., as indicated by arrows 619-*i* in FIG. 6). Due to the limited amount of space associated with portion 625-*i*, in a number of embodiments, the variable data unit type can be adjusted responsive to the host I/O workload. For instance, if the number of updates associated with overwrites to the logical address range corresponding to MU[i] is such that the available update space 625-*i* becomes filled, then the variable data unit type can be adjusted (e.g., changed from TP=1 to TP=0).

The portion 607-*i* of MU[i] can comprise a MU mapping table, for instance, having entries indicating the locations of the respective MUs 603 corresponding to MUG 609. The entries of MU mapping table 607-*i* can also indicate a variable data unit type (TP) corresponding to the respective MU. In this example, the number of MUs corresponding to MUG 609 is indicated by index "m". As such, each table entry of portion 607-*i* indicates a location on memory 610 of a particular one of the "m" MUs of MUG 609 (e.g., as indicated by physical mapping unit addresses PMUA[ ] through PMUA[m−1].

As shown in FIG. 6, entry 613-*i*, which corresponds to MU[i], indicates a variable data unit type TP=1, which in this example indicates that the data unit size mapped by portion 615-*i* is twice that of the base data unit size of 4 KB. As such, in this example, the variable data unit type TP=1 also indicates that half of space 605-*i* (e.g., 615-*i*) is used to map 8 KB data units and half of space 605-*i* (e.g., 625-*i*) is used to map data units (e.g., 4 KB data units) associated with overwrites to the logical addresses corresponding MU[i].

MU[j] 603-*j* shown in FIG. 6 is within the same MUG 609 as MU[i] 603-*i*. As such, portion 607-*i* of MU[i] comprises an entry 613-*j*, which indicates (via PMUA[j] represented by arrow 617-*j*) a physical location on memory 610 of MU[j], as well as a variable data unit type (e.g., TP=3) corresponding to MU[j]. In this example, TP=3 indicates that the data unit size corresponding to MU[j] is 32 KB (e.g., eight times the base data unit size of 4 KB). Since the data unit size corresponding to MU[j] is eight times that of the base data unit size, eight times fewer entries in MU mapping table 615-*j* are required to map the amount of logical space mapped by MU[j] than if the data size corresponding to MU[j] were the base data unit size. As such, portion 615-*j* comprises entries PA[0] through PA[PA_PER_MU/8], which provide indicators (e.g., as represented by arrows 611-*j*) pointing to the locations on memory 610 of 32 KB data units. Therefore, ⅞ of the space 605-*j* available for mapping to data units having a size defined by the variable data unit type corresponding to MU[j] is unused.

As described above, the portion 625-*j* can comprise a data structure such as a hash tree and/or b-tree, for instance, which can provide indicators pointing to data units corresponding to MU[j] that have a size other than the size defined by the variable data unit type (e.g., a size smaller than 32 KB, such as a size equal to the base data unit size). In this example, the portion 625-*j* provides pointers (e.g., as represented by arrows 619-*j*) to 4 KB data units on memory 610. The mapping data (e.g., tree entries) of portion 625-*j* can correspond to overwrites to the logical address space mapped by MU[j] (e.g., host initiated overwrites corresponding to logical space amounts less than the data unit size of 32 KB, in this example).

For a number of reasons, it may be useful to adjust the particular variable data unit type of one or more MUs (e.g., 603) of a MUG (e.g., to reduce the likelihood of fragmented and/or misaligned writes, to maintain accurate mapping data, etc). For instance, if a host issues a number of relatively small write commands, such as a number of 4 KB metadata writes to the logical address space of a particular MU, and the data unit size defined by the particular variable data unit type of the MU is larger than the 4 KB write size, then the space available for maintaining updates (e.g., 625-*i*) may reach and/or exceed capacity. As such, the particular variable data unit type of the MU can be adjusted to a different data unit type (e.g., a data unit type that defines a smaller data unit size). In a number of embodiments, the particular variable data unit type can be adjusted such that the defined data unit size of a particular MU is increased. For instance, if a host issues a number of 32 KB writes to the logical address space of a particular MU having a defined data unit size of 4 KB (e.g., TP=0), it can be beneficial to increase the defined data unit size of the MU to 32 KB (e.g., TP=3), for example. Increasing the data unit size of the MU can provide benefits such as reducing the amount of mapping data space (e.g., 605-*i*) of the data unit mapping table (e.g., 615-*i*), which increases the space (e.g., 625-*i*) available for mapping overwrites to the logical address space of the MU.

In a number of embodiments, a mapping unit management component (e.g., MU management 116 shown in FIG. 1) can monitor (e.g., track) the I/O workload of a host (e.g., host 102). For instance, the MU management component can track the sizes of incoming write commands and the MUs and/or MUGs to which they correspond (e.g., based on the logical addresses corresponding to the write commands). The MU management component can use the monitored information to, for example, determine the variable data unit types of the various MUs and/or whether to adjust the variable data unit types corresponding thereto.

As such, a number of embodiments of the present disclosure provide the ability to adjust the variable data unit type of MUs. Adjusting the variable data unit types can provide various benefits by providing a flexible address mapping scheme that can be implemented by an FTL (e.g., FTL 114 shown in FIG. 1), for instance, and that can be adapted to account for host I/O workload variability and/or irregularity, among other benefits.

Figure 7:
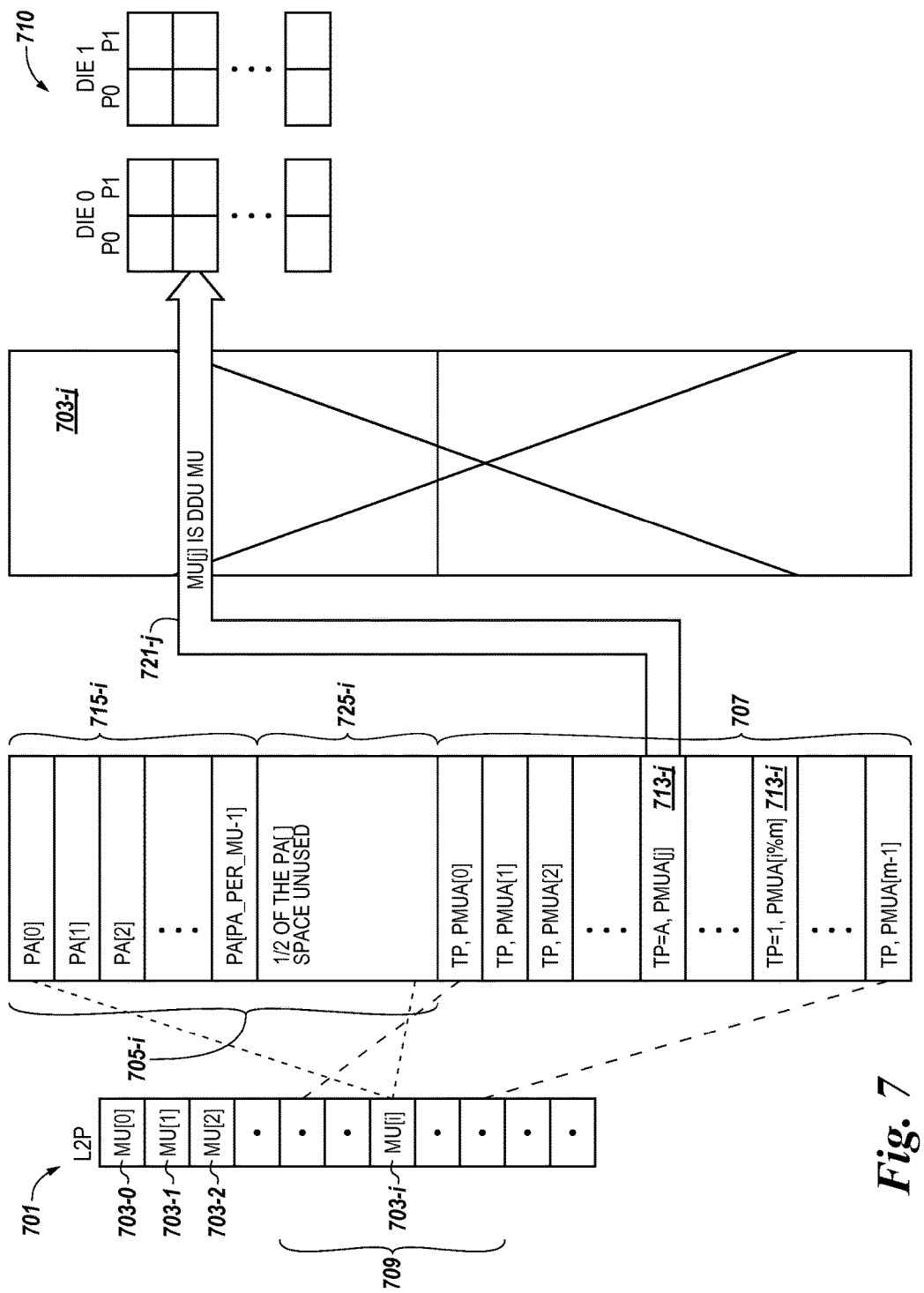
FIG. 7 illustrates a number of mapping units associated with address mapping in accordance with a number of embodiments of the present disclosure.

FIG. 7 illustrates a number of mapping units (703-0, 703-1, 703-2, . . . , 703-i, . . . ) associated with address mapping in accordance with a number of embodiments of the present disclosure. As described above, the MUs 703 can be organized as a number of MUGs such as MUG 709 in a L2P map 701. The MUs 703 and MUG 709 of FIG. 7 can be analogous to the MUs and MUGs described in association with prior Figures, for instance. In this example, the MUG 709 comprises MU 703-i (MU[i]), as well as a number of other "neighboring" MUs 703 (e.g., the other MUs 703 of the MUG 709 to which MU 703-i belongs). As shown in FIG. 7, MU[i] comprises a first portion 705-i comprising a data unit mapping table 715-i indicating locations on a memory 710 of a number of physical data units, and a second portion 707 comprising a MU mapping table indicating locations on the memory 710 of a number of other MUs of MUG 709, to which MU[i] belongs.

As described above, the portion 705-i of MU[i] can comprise a fixed amount of space. In a number of embodiments, an amount of the mapping table 705-i used for indicating locations (e.g., physical addresses) of data units having a size defined by the variable data unit type corresponding to the MU[i]. The amount of space 715-i can depend on the variable data unit type corresponding to MU[i].

In this example, as indicated by entry 713-i of MU table 707, the variable data unit type corresponding to MU[i] is TP=1, which can indicate that the data unit size corresponding to MU[i] is twice that of the base data unit size (e.g., 4 KB). That is, the data unit size defined by TP=1 is 8 KB. As such, there are half as many entries in data unit mapping table 715-i as there would be if the variable data unit type corresponding to MU[i] were TP=0 (with TP=0 corresponding to a defined variable data unit size equal to the base data unit size, e.g., 4 KB, in this example). That is, since the size of the data units corresponding to MU[i] is twice as large as the base data unit size, half as many table entries corresponding to portion 715-i are used in order to map the same amount of logical space mapped by MU[i] (4 MB, in this example). Therefore, if PA_PER_MU indicates the number of entries in table 715-i assuming a base data unit size, then PA_PER_MU/2 is the number of table entries in table 715-i assuming the data unit size corresponding to MU[i] is twice the base data unit size. As such, table 715-i shown in FIG. 7 includes entries PA[0] through PA[PA_PER_MU/2], and although not shown in FIG. 7, each of the entries points to an 8 KB data unit on memory (e.g., memory 710).

Since the variable data unit type (e.g., TP=1) corresponding to MU[i] is such that the size of the data unit mapping table 715-i is less than the amount of space 705-i available, a portion 725-i of the available space 705-i can comprise a data structure such as a tree (e.g., a hash tree, b-tree, etc.), for example, that maintains map updates associated with overwrites to the logical space mapped by MU[i] (e.g., due to host I/O workload variability/irregularity).

The portion 707 of MU[i] can comprise a MU mapping table, for instance, having entries indicating the locations of the respective MUs 703 corresponding to MUG 709. The entries of MU mapping table 707 can also indicate a variable data unit type (TP) corresponding to the respective MU. In this example, the number of MUs 703 corresponding to MUG 709 is indicated by index "m". In a number of embodiments, a number of the MUs 703 corresponding to MUG 709 can be direct data units (DDU) MUs. As used herein, a DDU MU can refer to a MU (e.g., 703-j) whose corresponding data unit size is equal to the amount of data mapped by each of the respective MUs (e.g., 703) of the MUG (e.g., 709) to which the particular MU (e.g., 703-j) belongs.

For instance, if each of the MUs 703 maps 4 MB of data, then a DDU MU (e.g., 703-j) maps to a single 4 MB physical data unit on memory, which is referred to as a DDU. In FIG. 7, mapping entry 713-j corresponding to MU[j] provides an indicator (represented by arrow 721-j) pointing directly to a location on memory 710 of the 4 MB data unit mapped by MU[j]. That is, PMUA[j] points directly to the DDU corresponding to DDU MU[j]. In a number of embodiments, the variable data unit type corresponding to a DDU MU is TP=A (where "A" can be a hexadecimal number). As such, entry 713-j includes attribute data comprising TP=A, as shown in FIG. 7. Since PMUA[j] points directly to the DDU corresponding to MU[j], as opposed to pointing to a location on memory 710 of MU[j] 703-j, MU[j] need not be stored on memory 710 and accessed in order to determine the location of the data units corresponding thereto. As such, the presence of one or more DDU MUs can reduce the total number of stored MUs, for instance.

Figure 8:
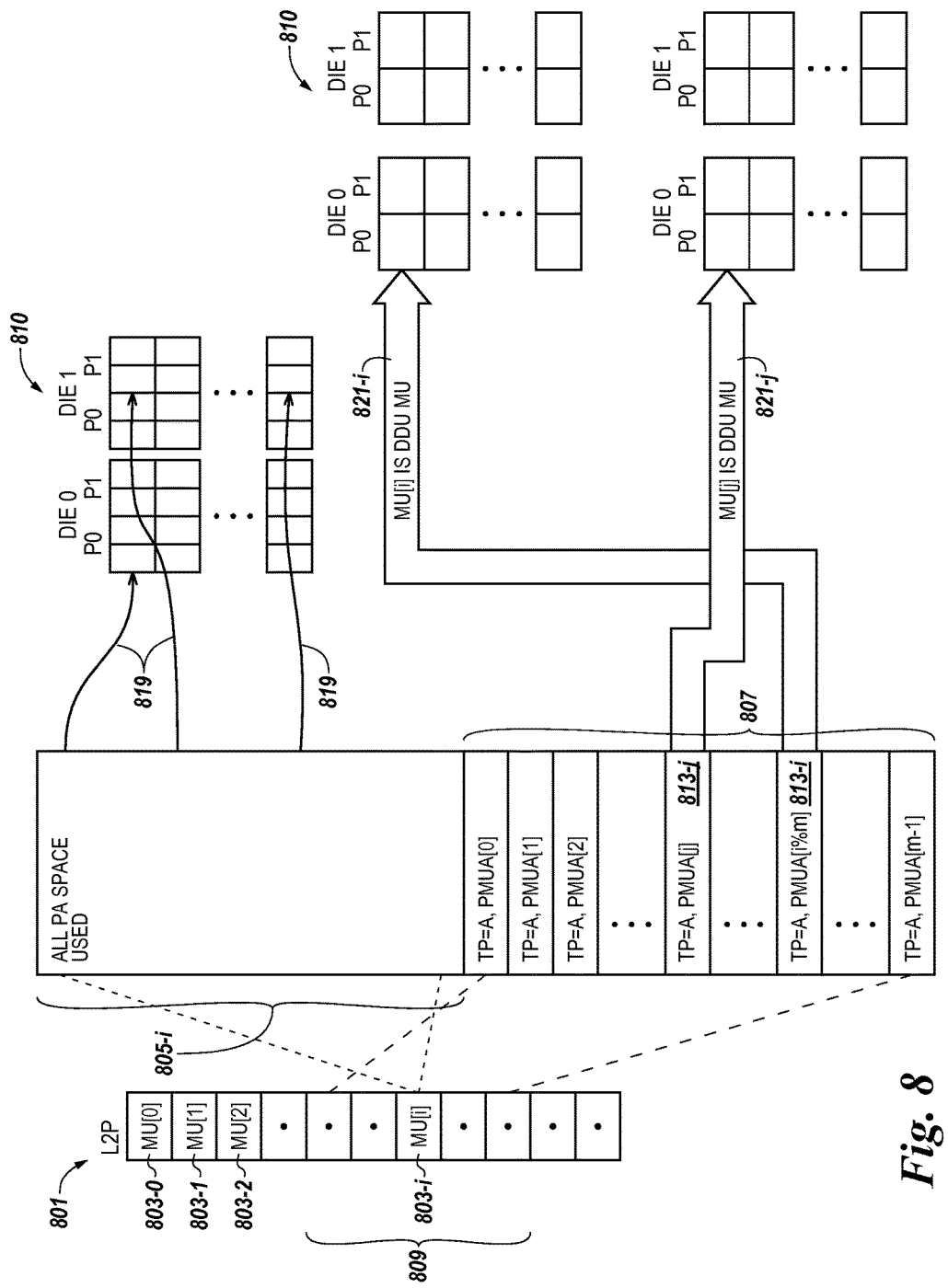
FIG. 8 illustrates a number of mapping units associated with address mapping in accordance with a number of embodiments of the present disclosure.

FIG. 8 illustrates a number of mapping units (803-0, 803-1, 803-2, . . . , 803-i, . . . ) associated with address mapping in accordance with a number of embodiments of the present disclosure. The MUs 803 are organized as a number of MUGs including MUG 809 in a L2P map 801. The MUs 803 and MUG 809 of FIG. 8 can be analogous to the MUs and MUGs described in association with prior Figures, for instance. In this example, MUG 809 comprises MU 803-i (MU[i]), as well as the other MUs 803 (including MU[j]) of the MUG 809 to which MU 803-i belongs).

In a number of embodiments, and as shown in FIG. 8, a MUG (e.g., MUG 809) can comprise all DDU MUs, such as DDU MU[j] described in association with FIG. 7. For instance, each of the MUs 803 of MUG 809 are DDU MUs. In the examples described herein, the variable data unit type corresponding to DDU MUs is TP=A. In such examples, TP=A defines the data unit size to be equal to the amount of data mapped by the MUs of a MUG, which in this example is 4 MB. Since each of the MUs 803 of MUG 809 are DDU MUs, each of the entries (e.g., 813-i, 813-j, etc.) in MU mapping table 807 includes a physical mapping unit address (e.g., PMUA[0] through PMUA[m−1]) indicating the location on memory 810 of a 4 MB data unit corresponding to a respective MU 803. For instance, as indicated by arrow 821-i, PMUA[i] points to the 4 MB data unit corresponding to MU[i], and as indicated by arrow 821-j, PMUA[j] points to the 4 MB data unit corresponding to MUM.

In embodiments in which a MUG includes only DDU MUs, the amount of space allocated for a data unit mapping table (e.g., mapping table 715-i shown in FIG. 7) can be omitted. As such, the space that would otherwise have been allocated for a data unit mapping table can be used for other purposes. For instance, in the embodiment illustrated in FIG. 8, the portion 805-i of MU[i] is used to maintain mapping updates associated with overwrites to the logical space mapped by MUG 809. For example, the portion 805-i can comprise a data structure such as a tree (e.g., hash tree, b-tree, etc.) to maintain the mapping updates corresponding to MUG 809. As shown in FIG. 8, the entries of the data structure of portion 805-*i* provide pointers (e.g., as represented by arrows 819) to data units on memory 810. In this example, the arrows 819 point to data units have a size equal to the base data unit size (e.g., 4 KB); however, embodiments are not so limited.

The data structure associated with portion 805-*i* can be similar to the data structures associated with portions 725-*i* described in FIGS. 7 and 625-*i* described in FIG. 6, for instance. However, the data structure of portion 805-*i* can be used to maintain updates corresponding logical addresses across the entire logical address space mapped by a MUG (e.g., as opposed to maintaining updates corresponding to logical addresses across the address space mapped by a particular MU within a MUG).

Figure 9:
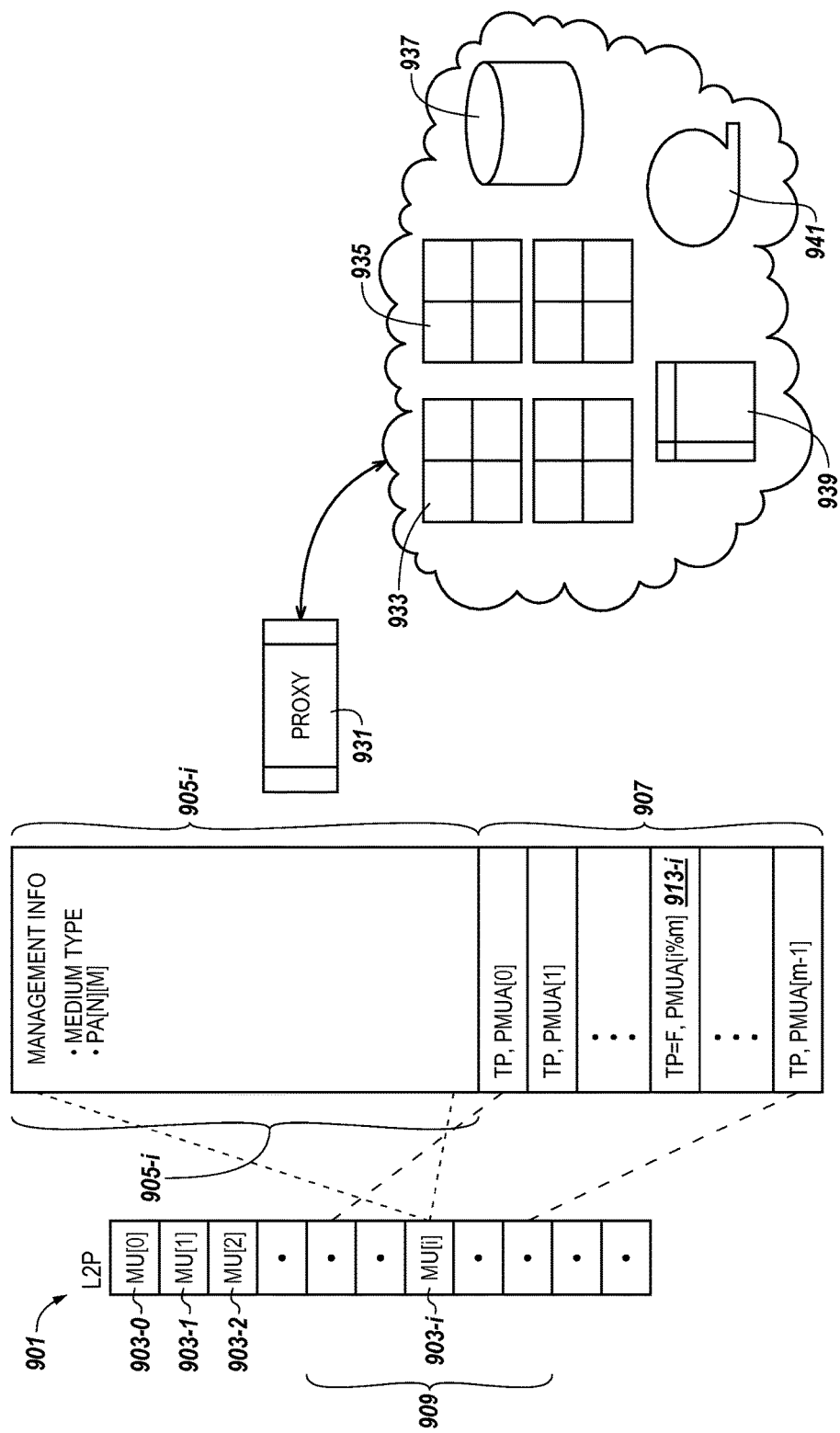
FIG. 9 illustrates a number of mapping units associated with address mapping in accordance with a number of embodiments of the present disclosure.

FIG. 9 illustrates a number of mapping units (903-0, 903-1, 903-2, . . . , 903-*i*, . . . ) associated with address mapping in accordance with a number of embodiments of the present disclosure. The MUs 903 are organized as a number of MUGs including MUG 909 in a L2P map 901. The MUs 903 and MUG 909 of FIG. 9 can be analogous to the MUs and MUGs described in association with prior Figures, for instance. In this example, MUG 909 comprises MU 903-*i* (MU[i]), as well as the other MUs 903 of the MUG 909 to which MU 903-*i* belongs).

The MU 903-*i* is a DDU MU, such as DDU MU 803-*i* described in association with FIG. 8. For instance, the data unit size defined by the variable data unit type of MU 903-*i* is equal to the total amount of data mapped by MU 903-*i* (e.g., 4 MB). However, MU 903-*i* has a different variable data unit type than MU 803-*i*. In the example shown in FIG. 9, the variable data unit type corresponding to MU 903-*i* is TP=F (as opposed to TP=A). As used herein, an MU having a variable data unit type of TP=F will be referred to as a "packet DDU" MU.

Packet DDU MU 903-*i* includes mapping data comprising a first portion 905-*i* and a second portion 907. The second portion 907 can be analogous to the second portion 807 of MU 803-*i*. That is, portion 907 can comprise a MU mapping table corresponding to the MUs 903 of MUG 909. However, the first portion 905-*i* comprises management information associated with packet DDU MU 903-*i* (e.g., as opposed to a data unit mapping table and/or tree data structure for maintaining updates as described above). The management information can include various information, which in this example includes medium type information and location information (e.g., PA[n][m] as shown in FIG. 9). The medium type information can indicate a particular type of medium to which the physical data unit corresponding to MU 903-*i* is mapped, and the location information can indicate a physical address on the particular type of medium of the physical data unit, for instance.

As an example, a packet DDU MU such as MU 903-*i* can be written to and/or retrieved from various types of media such as flash memory (e.g., MLC, SLC, etc.), DRAM, resistance variable memory (e.g., phase change memory, RRAM, etc.), storage area networks (SANs), and/or network attached storage (NAS), among other media types. As such, although various examples provided herein are based on a flash-page-based-framework, in various embodiments, the MUs of a L2P map (e.g., 901) can be managed outside of a flash-page-based-framework. As an example, a proxy component 931 (e.g., a proxy processor) associated with one or more different media types 933, 935, 937, 939, and/or 931 can be used to manage the MUs.

Figure 10:
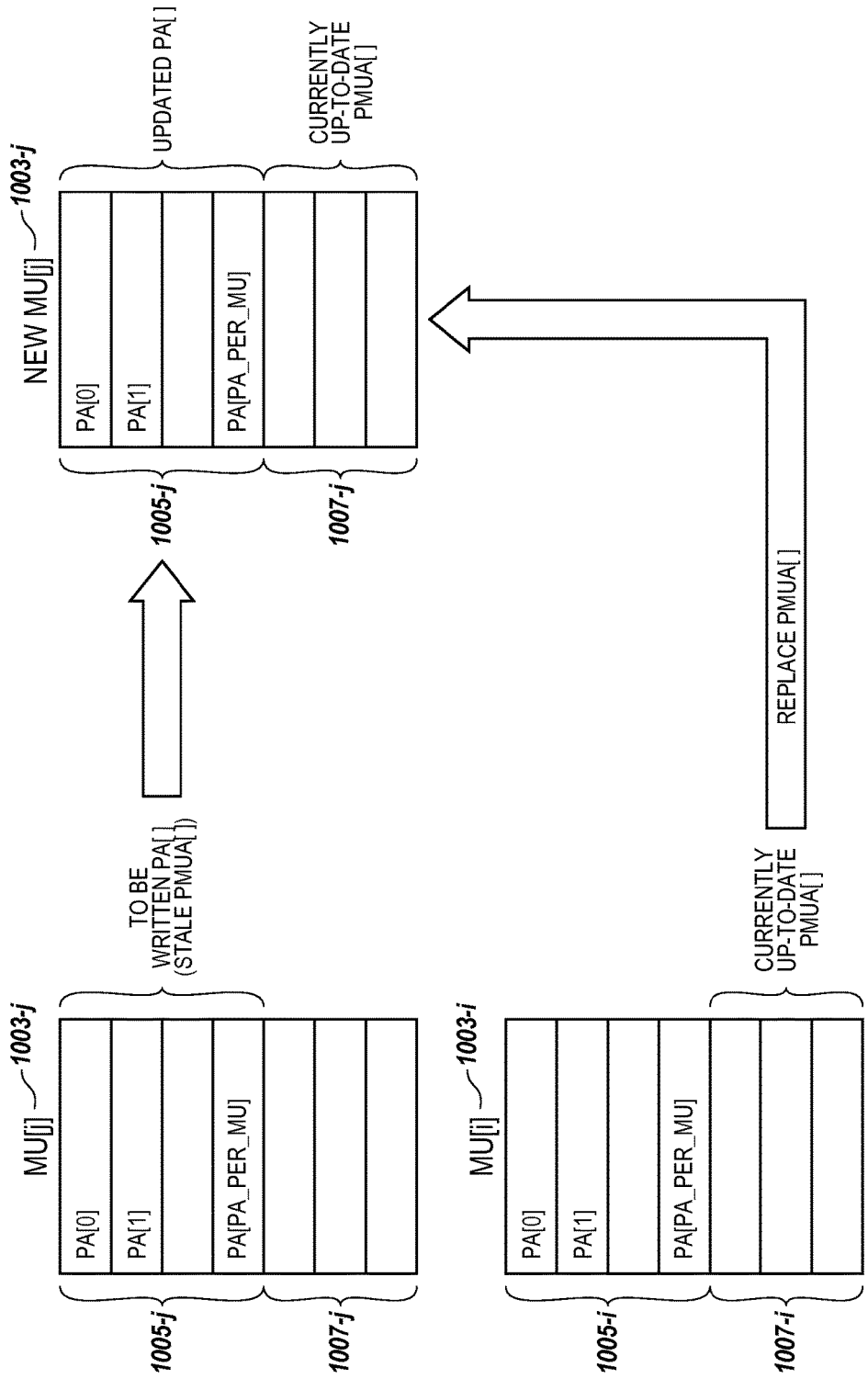
FIG. 10 illustrates a functional flow chart associated with updating a mapping unit in accordance with a number of embodiments of the present disclosure.

FIG. 10 illustrates a functional flow chart associated with updating a mapping unit in accordance with a number of embodiments of the present disclosure. In a number of embodiments, MUs such as those described herein can be stored in memory and garbage collected as appropriate. The MUs can be stored in a dedicated region of memory, for instance. As described herein, MUs can comprise a mapping unit table (e.g., 307, 407, 507, 607, 707, 807, 907) that can indicate the locations on memory of the MUs of a particular MUG. In a number of embodiments, a most recently written one of the MUs of a MUG includes the currently up to date MU table for the group. As such, the most recently written MU (e.g., the last MU to receive updates to its L2P mappings) is the current up to date MU and includes up to date indicators pointing to the physical locations of the MUs of a MUG. An indication of the current up to date MU of a MUG can be maintained by the controller, for instance.

In FIG. 10, MU[i] 1003-*i* represents a currently up to date MU. As such, MU 1003-*i* includes the currently up to date mapping table 1007-*i*. MU[j] 1003-*j* represents an MU, which is to be updated and subsequently written to memory. For instance, the entries associated with data unit table 1005-*j* of MU 1003-*j* may need to be updated responsive to a host-initiated write operation. Since MU 1003-*j* is not the currently up to date MU, its MU table 1007-*j* contains invalid indicators (e.g., MU table 1007-*j* is stale). After the data unit table 1005-*j* of MU 1003-*j* is updated, it will be written back to memory and will become the new currently up to date MU (e.g., the MU with the currently up to data MU mapping table).

As such, prior to writing MU 1003-*j* back to memory, its MU mapping table 1007-*j* is replaced with the currently up to date MU mapping table 1007-*i*. As shown on the right side of FIG. 10, the new MU[j] 1003-*j* includes the updated data unit mapping table (e.g., PA[ ]) and the currently up to date memory unit mapping table (e.g., PMUA[ ]). The new MU[j] 1003-*j* now contains the currently up to date MU mapping table 1007-*j*, which can be used to replace the stale MU table of a next MU to be updated and rewritten to memory.

CONCLUSION

The present disclosure includes methods, memory units, and apparatuses for address mapping. One method includes providing a mapping unit having logical to physical mapping data corresponding to a number of logical addresses. The mapping unit has a variable data unit type associated therewith and comprises a first portion comprising mapping data indicating locations on a memory of a number of physical data units having a size defined by the variable data unit type, and a second portion comprising mapping data indicating locations on the memory of a number of other mapping units of a mapping unit group to which the mapping unit belongs.

As used herein, the term "and/or" includes any and all combinations of a number of the associated listed items. As used herein the term "or," unless otherwise noted, means logically inclusive or. That is, "A or B" can include (only A), (only B), or (both A and B). In other words, "A or B" can mean "A and/or B" or "a number of A and B."

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for address mapping, comprising:
providing a mapping unit having logical to physical mapping data corresponding to a fixed range of non-overlapping logical addresses, the mapping unit having a data unit type associated therewith and comprising:
    a first portion comprising mapping data comprising a quantity of logical to physical mapping entries each indicating a location, on a memory, of a physical data unit corresponding to a particular amount of physical data, the physical data unit being external to the mapping unit, wherein the quantity of logical to physical mapping entries depends on a data unit size defined by the data unit type,
    wherein at least one data unit type corresponds with a particular amount of physical data that is less than a physical page size corresponding to a memory device to which the data is mapped, and
    wherein at least one data unit type corresponds with a particular amount of physical data that is greater than a physical page size corresponding to a memory device to which the data is mapped; and
    a second portion comprising mapping data, the mapping data comprising mapping entries indicating locations on the memory of a plurality of other mapping units of a mapping unit group to which the mapping unit belongs;
providing each of the mapping entries of the second portion with attribute data indicating the data unit type of the mapping unit to which the respective mapping entry corresponds, wherein a value of the attribute data indicates the size of physical data units mapped by the corresponding mapping unit, wherein the value of the attribute data is one of a plurality of values each corresponding to a multiple of a base data unit size;
wherein the data unit type corresponds to the particular amount of physical data to which the quantity of logical to physical mapping entries correspond, and wherein the data unit type is variable such that the amount of physical data to which the quantity of logical to physical mapping entries correspond is variable;
wherein the mapping units of the plurality of other mapping units each comprises:
    a first fixed amount of space allocated for a data unit mapping table; and
    a second fixed amount of space allocated for a mapping unit mapping table; and
    wherein the value of the attribute data corresponding to at least one of the plurality of other mapping units indicates the size of physical data units mapped by the corresponding data unit mapping table is a multiple of the base data unit size such that a fraction of the first fixed amount of space allocated for the data unit mapping table is unused; wherein the corresponding data unit mapping table comprises:
        a quantity of logical to physical mapping entries mapping to physical data units having the size indicated by the corresponding attribute data such that the size is the multiple of the base data unit size.

2. The method of claim 1, wherein the method includes updating the mapping unit responsive to a change in the logical to physical mapping data corresponding to one or more of the number of logical addresses.

3. The method of claim 1, wherein the method includes monitoring a host input/output (I/O) workload and adjusting the data unit size associated with the mapping unit based, at least partially, on the host I/O workload.

4. The method of claim 3, wherein adjusting the data unit size associated with the mapping unit includes adjusting the value of the attribute data corresponding to the mapping unit to increase the data unit size such that the quantity of logical to physical mapping entries corresponding to the first portion is decreased.

5. The method of claim 1, wherein the method includes providing a number of mapping unit groups, wherein each of the number of mapping unit groups comprises a same number of mapping units.

6. The method of claim 5, including providing the number of mapping unit groups such that each respective mapping unit corresponds to a same number of non-overlapping logical addresses.

7. A method for address mapping, comprising:
storing a number of mapping units on a memory, wherein the number of mapping units each include logical to physical mapping data corresponding to a number of logical addresses and a data unit type associated therewith, and wherein each respective one of the number of mapping units comprises:
    a first portion comprising a first fixed amount of space allocated for a data unit mapping table comprising a quantity of logical to physical mapping entries each corresponding to a particular amount of physical data stored on the memory; and
    a second portion comprising a second fixed amount of space allocated for a mapping unit mapping table comprising mapping entries indicating locations on the memory of a number of other mapping units of a mapping unit group to which the respective one of the number of mapping units belongs;
wherein the mapping entries of the second portion each include attribute data indicating the data unit type of the mapping unit to which the respective mapping entry corresponds, wherein the data unit type is variable and determines both a size of physical data units mapped by the corresponding mapping unit and a quantity of logical to physical mapping entries of the first portion, wherein a value of the attribute data determines the data unit type of the mapping unit, and wherein the value of the attribute data is one of a plurality of values each corresponding to a multiple of a base data unit size;

wherein the attribute data value of at least one of the number of other mapping units of the mapping unit group corresponds to a data unit size that is a multiple of the base data unit size such that the corresponding mapping table uses less than the first fixed amount of space allocated for the data unit mapping table, with a remaining portion of the first fixed amount of space comprising mapping entries corresponding to host initiated overwrites corresponding to logical sizes less than the data unit size corresponding to the at least one of the number of other mapping units; and accessing a particular one of the number of mapping units stored on the memory based on a logical address associated with a write command and corresponding to the particular one of the number of mapping units.

8. The method of claim 7, wherein the method includes updating the accessed particular one of the number of mapping units prior to writing the updated particular mapping unit to the memory.

9. The method of claim 8, wherein updating the accessed particular one of the number of mapping units comprises:
determining a most recently updated mapping unit of a mapping unit group to which the accessed particular one of the mapping units belongs; and
replacing the mapping data corresponding to the second portion of the accessed particular one of the mapping units with the mapping data corresponding to the second portion of the most recently updated mapping unit, such that the updated particular mapping unit becomes the most recently updated mapping unit of the mapping unit group.

10. The method of claim 7, wherein the method includes adjusting a current data unit type of at least one of the number of mapping units based on an input/output (I/O) workload of a host.

11. The method of claim 7, wherein the method includes receiving the write command from a host.

12. An apparatus, comprising:
a memory storing a logical to physical mapping data structure comprising a plurality of mapping units each having a data unit type of a number of different data unit types associated therewith; and
a controller coupled to the memory and configured to:
access a particular mapping unit based on a logical address associated with a write command received from a host; and
update a portion of the particular mapping unit, the portion comprising:
a first fixed amount of space allocated for a data unit mapping table comprising a quantity of logical to physical mapping entries each indicating a location, on a memory, of a physical data unit corresponding to a particular amount of physical data, the physical data unit being external to the mapping unit;
wherein at least one data unit type corresponds with a particular amount of physical data that is less than a physical page size corresponding to a memory device to which the data is mapped, and
wherein at least one data unit type corresponds with a particular amount of physical data that is greater than a physical page size corresponding to a memory device to which the data is mapped;

wherein the data unit type is variable and is based on a value of attribute data corresponding to the particular mapping unit, wherein the value of the attribute data is one of a plurality of values comprising:
a first value corresponding to a first data unit type and indicating the data unit size of the corresponding mapping unit is equal to a base data unit size; and
a plurality of second values corresponding to respective second data unit types indicating the data unit size of the corresponding mapping unit is equal to a multiple of the base data unit size;
and
wherein the attribute data corresponding to at least one of the plurality of mapping units is the first value corresponding to the first data unit type such that a whole of the first fixed amount of space allocated for the data unit mapping table is used for mapping data units corresponding to the base data unit size; and
wherein the attribute data corresponding to at least one of the plurality of mapping units is one of the plurality of second values corresponding to a second data unit type indicating the data unit size corresponding to the mapping unit is equal to a multiple of the base data unit size such that a fraction of the first fixed amount of space allocated for the data unit mapping table is used for mapping data units corresponding to the multiple of the base data unit size, with a remaining fraction of the first fixed amount of space being unused.

13. The apparatus of claim 12, wherein the particular mapping unit comprises a another portion comprising mapping data indicating locations on the memory of each of a number of mapping units of a mapping unit group to which the particular mapping unit belongs.

14. The apparatus of claim 13, wherein the mapping data of the another portion comprises a mapping unit table and wherein the controller is configured to update the mapping unit table by replacing the mapping unit table with a currently up to date mapping unit table of another mapping unit of the mapping unit group.

15. The apparatus of claim 14, wherein the controller is configured to:
write the particular mapping unit to memory subsequent to replacing the mapping unit table with the currently up to date mapping unit table of the another mapping unit; and
subsequently determine a location on the memory of a different mapping unit of the mapping unit group by accessing the replaced mapping unit table of the particular mapping unit.

16. The apparatus of claim 12, wherein:
the number of mapping units are organized into a number of mapping unit groups;
each of the number of mapping unit groups maps a same amount of data;
each of the mapping units within a particular mapping unit group maps a same amount of data; and
each of the number of mapping units has a fixed amount of available data space, wherein the fixed amount of available data space includes a portion comprising a mapping unit table indicating the physical locations of each of the mapping units of the mapping unit group to which a respective mapping unit belongs.

17. The apparatus of claim 12, wherein:
the number of mapping units are organized into a number of mapping unit groups;
and at least a portion of mapping units of the at least one of the mapping unit groups is used to maintain mapping updates associated with overwrites to the logical space mapped by the at least one of the mapping unit groups.

18. The apparatus of claim 12, wherein the controller is configured to access at least one mapping unit stored on a medium having a different type than a medium type of the memory.

19. An apparatus, comprising:
a memory storing a number of mapping units each having one of a plurality of variable data unit types associated therewith, the particular one of the plurality of variable data unit types based on an attribute data value corresponding to the mapping unit, wherein the attribute data value determines whether a particular mapping unit maps to physical data units having a base data unit size or to physical data units having a multiple of the base data unit size; and
a memory unit management component configured to:
monitor an input/output (I/O) workload of a host; and
determine whether to adjust the attribute data value of at least one of the number of mapping units based on the I/O workload of the host;
wherein each respective mapping unit comprises:
a first fixed amount of space allocated for logical to physical mapping entries, wherein a first portion of the first fixed amount of space is allocated for logical to physical mapping entries each pointing to a physical data unit stored on the memory and having the size determined based on the attribute data value; and
a second fixed amount of space allocated for a mapping unit mapping table whose entries point to locations on the memory of a plurality of other mapping units of the number of mapping units;
wherein, for those mapping units having an attribute data value indicating the mapping unit maps to physical data units having a multiple of the base data unit size, a fraction of the first fixed amount of space allocated for logical to physical mapping entries is unused, and wherein each of at least three of the mapping units have different associated attribute data values such that the respective first portions of the at least three of the mapping units have different respective quantities of logical to physical mapping entries.

20. The apparatus of claim 19, wherein a memory unit management component configured to monitor an input/output (I/O) workload of a host comprises a memory unit management component configured to track a size of write commands corresponding to the logical addresses mapped by each of the number of mapping units.

21. The apparatus of claim 19, wherein a memory unit management component configured to determine whether to adjust the data unit type of at least one of the number of mapping units based on the I/O workload of the host comprises a memory unit management component configured to determine whether to adjust the data unit type such that the data unit size defined by the data unit type is decreased.

22. The apparatus of claim 19, wherein a memory unit management component configured to determine whether to adjust the data unit type of at least one of the number of mapping units based on the I/O workload of the host comprises a memory unit management component configured to determine whether to adjust the data unit type such that the data unit size defined by the data unit type is increased.

23. The apparatus of claim 19, wherein the controller is configured to:
retrieve a particular one of the number of memory units from the memory;
update a data unit mapping table of the particular memory unit; and
update a memory unit mapping table of the particular memory unit prior to writing the particular memory unit back to the memory.

24. The apparatus of claim 23, wherein the data unit mapping table includes pointers to locations on the memory of an amount of physical data having a size defined by the data unit type, and wherein the memory unit mapping table indicates the data unit type of each of the memory units of a memory unit group to which the particular memory unit belongs.

25. The apparatus of claim 19, wherein the memory unit management component is located on a memory system that includes the memory.

26. The apparatus of claim 19, wherein the memory unit management component is located on a controller coupled to the memory.

* * * * *